United States Patent
Radle et al.

(10) Patent No.: US 7,100,900 B2
(45) Date of Patent: Sep. 5, 2006

(54) NON-CONDUCTIVE FISH TAPE

(75) Inventors: Patrick J. Radle, Mequon, WI (US);
Daryl C. Brockman, Shorewood, WI (US); David A. Huebschen, Menomonee Falls, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 11/235,940

(22) Filed: Sep. 27, 2005

(65) Prior Publication Data

US 2006/0065883 A1 Mar. 30, 2006

Related U.S. Application Data

(60) Provisional application No. 60/614,931, filed on Sep. 30, 2004.

(51) Int. Cl.
*H02G 1/08* (2006.01)
(52) U.S. Cl. .......................... 254/134.3 FT
(58) Field of Classification Search ....... 254/134.3 FT, 254/134.3 R, 134.4
See application file for complete search history.

(56) References Cited

U.S. PATENT DOCUMENTS

| | | | |
|---|---|---|---|
| 2,750,152 A | 6/1956 | Schinske | |
| 3,858,848 A | 1/1975 | MacFetrich | |
| 4,684,211 A | 8/1987 | Weber et al. | |
| 5,039,196 A | 8/1991 | Nilsson | |
| 5,423,517 A * | 6/1995 | Rausch | 254/134.3 FT |
| 5,505,432 A | 4/1996 | Noonan | |
| 5,588,613 A | 12/1996 | Nagy | |
| 2006/0065883 A1 * | 3/2006 | Radle et al. | 254/134.3 FT |

* cited by examiner

*Primary Examiner*—Lee D Wilson
(74) *Attorney, Agent, or Firm*—Quarles & Brady LLP

(57) ABSTRACT

A fish tape assembly has a flat tape made of a hybrid composite of electrically non-conductive materials, preferably a fiberglass core surrounded by a nylon jacket. The flat tape has a rectilinear lateral cross-section with its width dimension being greater than its thickness. A non-conductive feed piece is bonded to the leading end of the fish tape. The feed piece has a wedged leading end. A non-conductive anchor piece is bonded to the trailing end of the fish tape to attach the fish tape to a reel assembly. The anchor piece is angled to mount the fish tape in a generally tangential direction relative to the reel.

22 Claims, 4 Drawing Sheets

NON-CONDUCTIVE FISH TAPE

CROSS-REFERENCE TO RELATED APPLICATION

This claims the benefit of U.S. Provisional Patent Application No. 60/614,931 filed Sep. 30, 2004.

STATEMENT OF FEDERALLY SPONSORED RESEARCH OR DEVELOPMENT

Not applicable.

BACKGROUND OF THE INVENTION

1. Technical Field

This invention relates to fish tapes of the type used by electricians to pull wire through conduit or other spaces, and more particularly to the construction of a non-conductive fish tape assembly.

2. Description of the Related Art

A fish tape is an elongated "wire" or flexible rod typically used to install wire in conduit or through existing walls by pushing the tape through the conduit or wall, attaching the wire, and pulling it back. Steel fish tape is often used because it is stiff enough to be pushed through conduit without collapsing or kinking, flexible enough to negotiate bends or turns, and strong enough to pull multiple wires back through the conduit without breaking or separating under what can be considerable pulling forces. The steel tape can be flat in that has a smaller thickness than width, which aids in the ability to "steer" the tape as it is pushed through the wall or conduit. However, steel may be disadvantageous because it is heavy, possibly too rigid for tight bends, and importantly because it can conduct electricity, it may not be suitable for use near live circuits with open contacts, such as in switch boxes or fuse/breaker panels.

Fish tape made of plastic fibers, such as fiberglass, have been devised to avoid the aforementioned concerns with steel fish tape. Namely, such fish tapes are lighter, more flexible and do not conduct electricity, while at the same time providing high tensile strength. Because fiberglass can splinter, it may be covered by an extruded plastic jacket having better wear and toughness characteristics that is also of lower coefficient of friction to allow it to slide through the wall or conduit easier. The fiberglass or fiberglass composite fish tapes are typically extruded rods having a circular cross-section. The circular cross-section is disadvantageous in that makes the fish tape less steerable and adds to its thickness such that it requires more space when wound in the reel.

Long lengths of fish tape are used, for example 25 ft., 50 ft. and 100 ft. lengths are standard, because the fish tape is snaked through walls and conduit. To make the long run of fish tape manageable during use and storage it is use typically wound about a reel. One end of the fish tape is usually fixed to a stationary or rotatable part of the reel to keep it from coming loose. The other, leading end of the fish tape is adapted in some way to readily attach the wire to be pulled by the fish tape through the wall or conduit. For steel tapes, the ends may be turned back into a "U" or a loop to directly hook onto or loop a catch inside the reel at the trailing end or the wires at the leading end. However, it is not possible to bend fiberglass fish tapes to form a hook or loop. Thus, tips must be attached to the ends of a fiberglass fish tape that have some type of attachment member. At the leading end, the attachment member is often an eyelet through which the wire can be tied.

The connection to the reel can be problematic. The tape may disengage the catch, or worse, the tape may break when high pulling loads arise. The latter problem can arise when the fiberglass tape is connected to reel in way that extends it radially relative to the reel. When the fish tape is completely unwound from the reel and pulling loads are applied, a bending moment is applied to the fish tape which can cause it to fracture.

The tip at the leading end of the fish tape can also be problematic, most commonly with regard to its ability to feed through the wall or conduit and its connection to the fish tape. The tip is usually a steel piece, however it may be plastic, see e.g. the ferrule item 17 disclosed in U.S. Pat. No. 3,858,848 to MacFetrich. The leading end of a tip for a steel tape usually has flat tapered sides, while for a fiberglass tape it is usually bullet-shaped with a spherical or conical due to the circular cross-section of the fiberglass rod. Considerable effort has been undertaken to lessen the resistance in the feed direction, however, this still remains a problem.

Various techniques have been used to attach the tip to the fish tape including depending on the materials and configuration of the tip used. Welding and threaded attachments are common for steel fish tapes. Fiberglass fish tapes typically employ a friction connection, such as crimping, or an adhesive. A taper-lock connection can be used in which the fish tape is inserted into a conical bore in an externally threaded inner part of the tip and then expanded in the bore by threading a screw into the end of the tape bore the outer part of the tip is threaded onto the inner part. Although various methods of connection have been devised, it is common for tips to pull off of the fish tape under high pulling loads or to loosen after prolonged use.

Accordingly, a non-conductive fish tape assembly is desired with improved construction of the fish tape and end pieces.

SUMMARY OF THE INVENTION

The present invention is an improved non-conductive fish tape having a "flat" rectilinear tape construction providing strength, feedablity, steerability and windablity similarly to flat metal tapes but with lower cost, increased lubricity, lighter weight and without the risk of causing electrical shorting during use. Non-conductive end pieces of the fish tape are constructed to further these benefits.

In one aspect the invention provides a fish tape assembly including a fish tape mounted to a reel so as to be capable of being unwound in a feed direction relative to the reel. The fish tape is made of an electrically non-conductive material and has a rectilinear cross-section.

In preferred forms, the fish tape is a composite of at least two materials, which are both preferably electrically non-conductive, and more preferably are a fiberglass core surrounded by a nylon jacket. The fish tape is preferably "flat" which as used herein means of a greater lateral width dimension than its thickness dimension. The width dimension is preferably at least 1.5 times the thickness dimension, and even more preferably at least 2 times, which is preferably 2 millimeters.

The rectilinear construction means that the fish tape has multiple straight sides. As one example, the fish tape has a "flat", rectangular cross-sectional shape with a 4 mm width and 2 mm thickness. The fish tape can bend more easily in the thickness direction than in the width direction, which allows it to follow tighter bends through walls and conduit and be "steered" more accurately across floors and ceilings than conventional circular cross-section fish tape, which is more apt to follow coiled path under such circumstances. The small thickness also allows the fish tape to occupy less space when wound. For example, the inventors have found that a 180 foot length of fish tape with the above cross-sectional dimensions can be wound inside of a 12 inch housing, which would ordinarily hold only 100 feet of a 4 mm diameter circular cross-section fish tape.

A feed piece can be connected to a leading end of the fish tape. The feed piece can be made of an electrically non-conductive material, such as a suitable thermoset plastic. The feed piece has a rectilinear opening at its trailing end that receives the fish tape and provides a location for bonding the parts together, preferably using a suitable high-strength adhesive. The leading end of the feed piece is wedge-shaped, rather than blunt or rounded over. And, the feed piece includes an eyelet allowing attachment of wires. Thus, electrically insulted feed piece provides better pull strength with less risk of separation. The wedged front end of the feed piece also allows for better feeding through walls and conduit than conventional rounded ends.

An anchor piece can also be connected to a trailing end of the fish tape for fixing the tape to the reel. The anchor piece is configured to connect to the reel such that the trailing end of the fish tape extends in a tangential direction with respect to the reel. Preferably, the anchor piece is angled or dog-leg shaped. One leg of the anchor piece has a rectilinear recess which receives the fish tape and provides a bonding location. The other leg has a mounting member, which preferably is a simple through opening through which can pass a fastener that joins mating halves of the reel together. This arrangement provides a secure, pivotal connection without the need for additional fasteners or assembly operations. The generally tangential direction of the trailing end of the fish tape reduces the bending moment realized when the tape is pulled after being completely unwound from the reel, and thus, reduces the likelihood of the fish tape fracturing and/or separating from the reel.

Another aspect the invention provides a fish tape assembly having an electrically non-conductive fish tape and an electrically non-conductive feed piece with an eyelet. The feed piece is bonded to the leading end of the fish tape to be able to withstand a pulling load of 500 pounds without separating from the fish tape.

Another aspect the invention provides a fish tape assembly having an electrically non-conductive fish tape with a rectilinear cross-section and having an electrically non-conductive feed piece with a rectilinear opening where the feed piece is bonded to the fish tape.

Yet another aspect of the invention a fish tape assembly an electrically non-conductive fish tape with a rectilinear cross-section, an electrically non-conductive feed piece mounted to the leading end of the fish tape, and an electrically non-conductive anchor piece mounted to the trailing end of the fish tape.

The advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENTS

The drawings referenced herein illustrate a preferred version of a fish tape reel assembly 10. This reel assembly is preferred because of its durability and many ergonomic, and is described in detail in a co-pending PCT application filed on Aug. 6, 2004, entitled "Ergonomic Fish Tape" which claims priority to U.S. provisional application Ser. No. 60/493,819, filed on Aug. 8, 2003, the entire disclosure of which is incorporated by reference herein for its teaching on the construction, assembly and use of a preferred reel assembly for use with the fish tape of the present invention.

Figure 1:
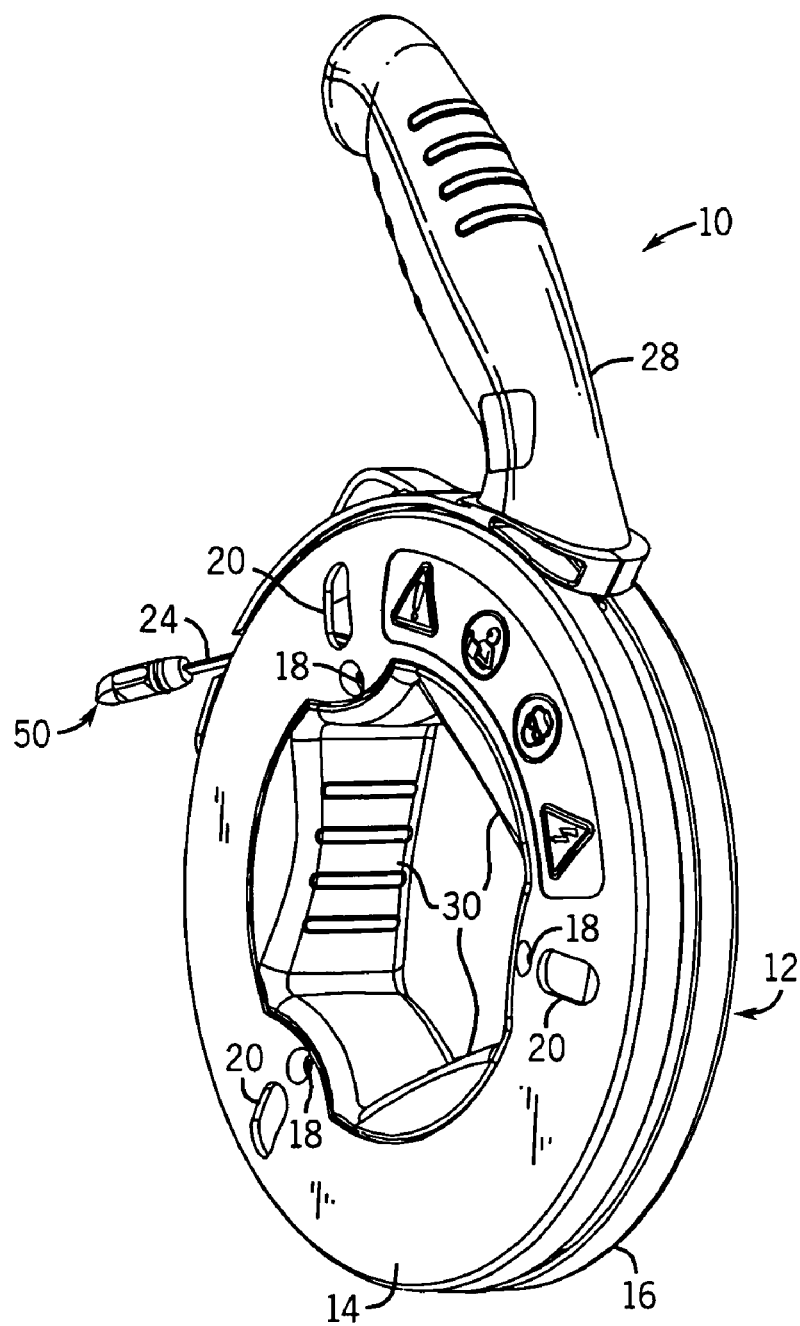
FIG. 1 is a perspective view of a non-conductive fish tape assembly according to the present invention.
Figure 2:
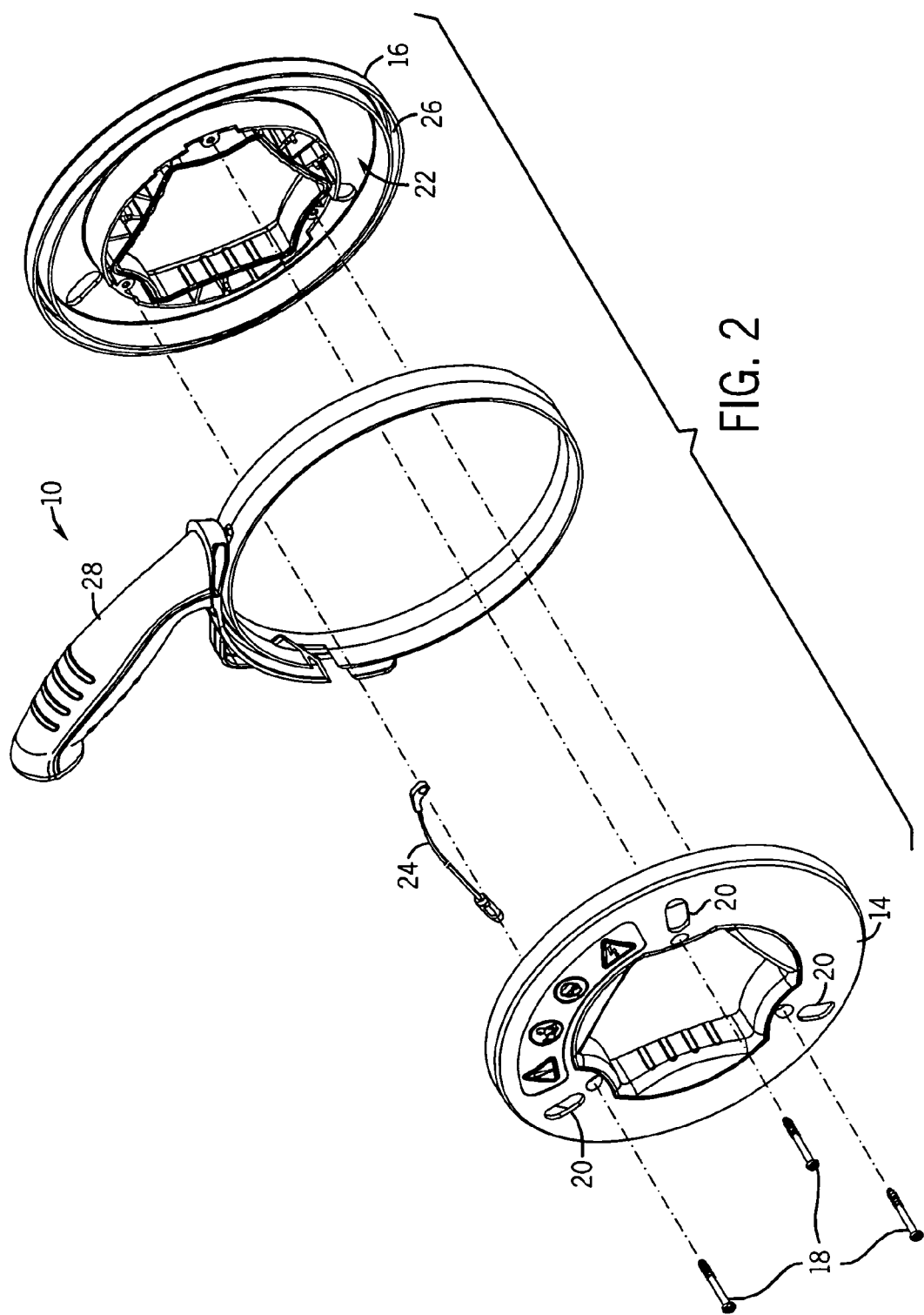
FIG. 2 is an exploded perspective view thereof.
Figure 3:
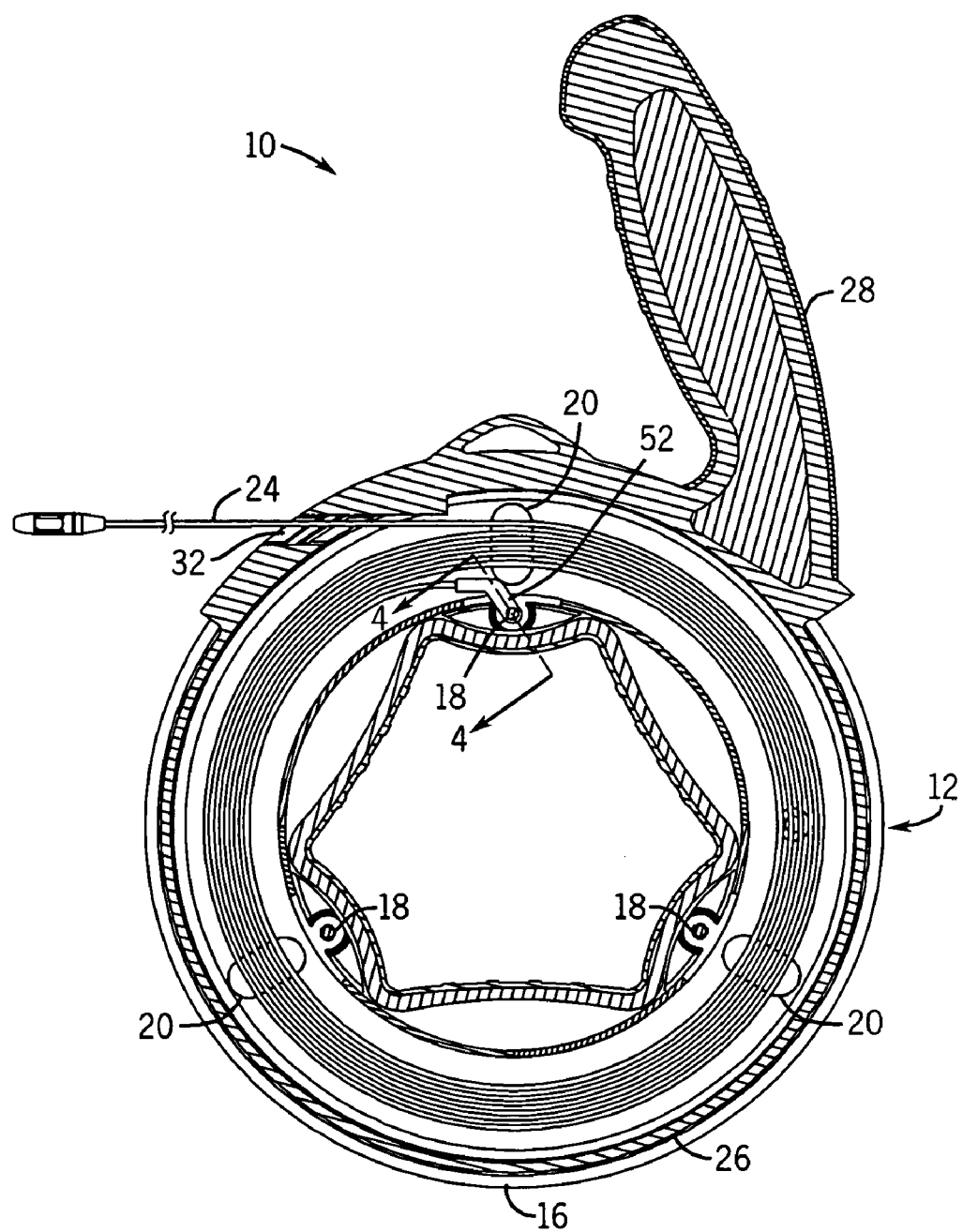
FIG. 3 is a side sectional view taken thereof.

Briefly then, with reference to FIGS. 1–3, the reel assembly 10 includes a reel housing 12 having two annular housing parts 14 and 16 joined together by three angularly spaced fasteners 18, which are aligned with windows 20, to define an annular cavity 22 in which a length of fish tape 24 is wound. The reel housing parts 14 and 16 also define an annular groove 26, ringing the annular cavity 22, in which a circular, band-like shoe of a pistol grip 28. The shoe retains the reel housing 12 to the grip 28 and allows it to be rotated as needed to unwind the fish tape from the reel and then to be wind the fish tape back onto the reel. Three inner hand grips 30 are formed at the interior of the center opening to facilitate rotation of the reel housing. The fish tape passes through an exit aperture 32 or passageway that extends generally tangentially from the annular cavity to guide the fish tape along the intended feed direction, which is essentially perpendicular to a vertical center line of the reel.

Generally, the reel assembly is used by grasping the pistol grip 28 with one hand and unwinding it in the feed direction with the other hand, either by simply pulling on the leading end or rotating the reel housing by the hand grips 30. The fish tape then be fed through the conduit, wall, under carpet, in the ceiling or other such place until the leading end reaches an open area at the other side of the structure where wires or other items can be attached to the fish tape. The fish tape is then pulled back to pull the wires through the structure until they are accessed from the near side of the structure. The fish tape can be wound back onto the reel during or after it is pulled through the structure.

Referring now to FIGS. 3–7, the fish tape is an elongated tape made of an electrically non-conductive material. Preferably, the tape is actually a hybrid composite structure made of multiple materials, with at least the outermost material being electrically inert, even more preferably all of the materials making up the composite structure are electrically non-conductive.

A resin-encased fiberglass strand core 40 covered in a plastic jacket 42 is one preferred composite structure. The jacket 14 helps protect the fiberglass from damage while being used, and is preferably a nylon 6,6 due to that material's high durability and wear resistance, flexibility, low friction, and moldability. However, polypropylene, polyethylene or other plastics with properties similar to nylon could be used. Preferably, the fiberglass core and nylon jacket are formed together in a co-injection molding process.

Figure 7:
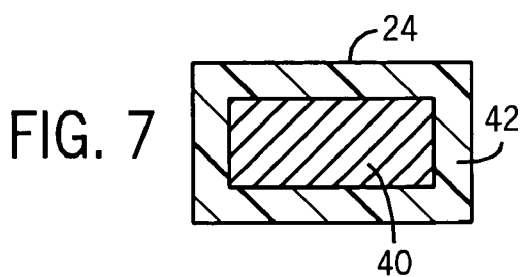
FIG. 7 is an end sectional view taken along line 7—7 of FIG. 5 showing the composite construction of the fish tape.

Rather than being a rod-like structure having a circular cross-section, the fish tape is preferably rectilinear in cross-section, meaning that the fish tape has at least one straight side. Further, the fish tape is preferably "flat" which means that its width dimension is greater than its thickness dimension. FIG. 7 depicts one preferred form of the fish tape which is rectangular in cross-section with its width dimension being 1.5 or more times its thickness dimension. Working models of the fish tape having a 4 mm width and a 2 millimeter thickness have proved to be desirable.

The narrow width dimension allows the fish tape to occupy less space with wound as compared to conventional fiberglass rod fish tape (with a circular cross-section). For example, the cavity of a 12" diameter reel housing can hold only about 100 feet of conventional fiberglass rod fish tape compared to about 180 feet of similarly sized flat fish tape according to the present invention. The rectilinear configuration, and particularly the greater width dimension, increases its lateral stability and makes the fish tape much more "steerable" than conventional fiberglass rod fish tape so that it can be navigated on horizontal surfaces more accurately and without coiling.

Figure 5:
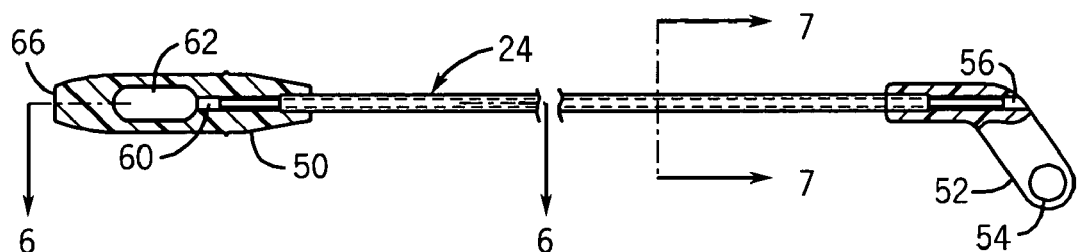
FIG. 5 is a side sectional view of the fish tape including its tapered feed end and angled anchor end.

As shown in FIG. 5, a feed piece 50 is mounted to the leading end (at the exterior of the reel) of the fish tape and an anchor piece 52 is mounted to the trailing end of the fish tape. In a preferred form, both of these end pieces are made of a high strength, non-conductive material, such that the entire run of the fish tape assembly (tape and end pieces) does not conduct electricity. A preferred plastic for the end pieces is commercially available as Grivory GV-5H Natural from EMS-Grivory, North America of Sumter, S.C. Grivory GV-5H is a 50% glass-fiber reinforced engineering thermoplastic material based on a combination of semi-crystalline polyamide with partially aromatic copolyamide. It is well suited for injection molding and exhibits high strength, dimensional stability and good surface finish.

The anchor piece 52 is angled in a dog-leg shape or boomerang shape with one leg having an attachment member in the form of a through opening 54 extending in the direction of the width dimension of the fish tape. The other leg of the anchor piece 52 has a countersunk opening or socket 56 extending in the long dimension of the fish tape. The cross-section of the socket 56 matches the rectilinear cross-section of fish tape, with the smaller portion of the socket 56 being sized to receive only the inner material and the larger portion being sized to receive the full dimension of the fish tape. The socket is open-ended to permit the free flow of adhesive and the evacuation of air bubbles that may otherwise interfere with the bond.

The anchor piece is preferably bonded to the trailing end of the fish tape, and more preferably is bonded by an adhesive. A preferred adhesive is a cyanoacrylate ester, such as JET SET 41 available from Holdtite Adhesives, Ltd., Tyne & Wear U.K., or LOCTITE 414 available from Loctite Corporation, North American Group, Rocky Hill, Conn. Although a cyanoacrylate ester adhesive is preferred for its quick set and cure times, other adhesives, such as two part thermoset adhesives may be used. Two part thermoset adhesives, such as epoxies and the like, provide a superior tensile strength at the expense of longer setting and cure times.

The adhesive is placed inside the socket the trailing end of the fish tape is inserted into the socket. In order to provide a strong bond between the fish tape and adhesive, the outer jacket is stripped away from the fiberglass core prior to insertion into the socket thereby allowing the adhesive to bond directly with the fiberglass to create a strong bond. When stripping off the jacket, care should be taken not to kink, cut or scrape the resin "skin" of the internal fiberglass. The fish tape jacket is tucked into the countersunk portion of the opening, thus eliminating a catch point when the fish tape is used.

Figure 4:
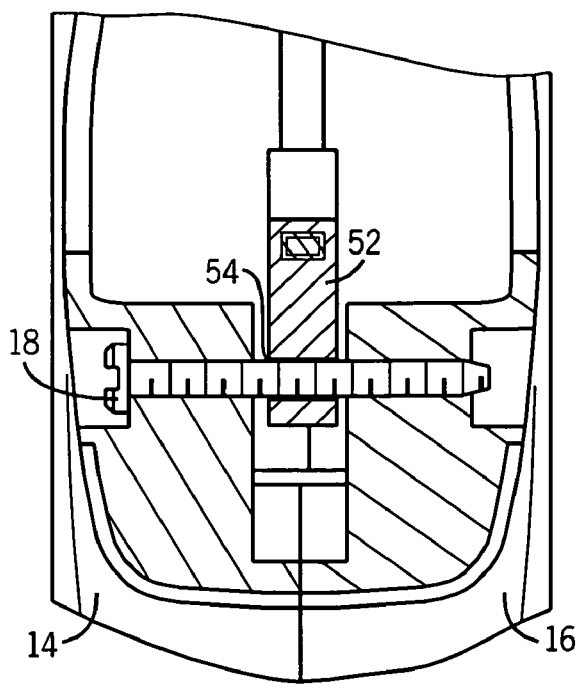
FIG. 4 is a detail section view showing the connection of the fish tape to the reel.

As shown in FIGS. 3 and 4, the fish tape is anchored to the inside of the reel housing by inserting one of the housing fasteners through the opening 54 of the anchor piece during assembly. The associated window 20 gives the assembler a clear view of the fastener to facilitate anchoring the fish tape. The angle of the anchor piece is such that the trailing end of the fish tape extends in a direction generally tangential to the connection to the reel housing. This aids in reducing the bending moment realized by the trailing end of the fish tape when the wires are pulled through the structure, which can be especially high at the trailing end when the fish tape is fully unwound. Thus, an improved connection is provided that reduces the likelihood of fracturing or other damage to the fish tape which could result in the fish tape being separated from the reel.

The feed piece is mounted to the leading end of the fish tape at a counter-sunk open-ended socket 60 in its trailing end, again by stripping away the jacket and bonding the inner core, preferably with an adhesive, as described above with regard to the anchor piece. The feed piece is mounted to the leading end of the fish tape to the outside of the reel housing, and is larger than the exit aperture so that it is prevented from backing into the interior of the reel housing. The feed piece has an eyelet 62 that opens laterally in the width direction of the fish tape to provide an attachment point for wire and the like to be pulled through conduit by the fish tape. The strength of the material and the geometry and wall thickness of the feed piece around the eyelet all it to be very strong. The inventors have successfully conducted pull tests of over 500 pounds, and expect that the feed piece is capable of withstanding 700 pounds or more.

Figure 6:
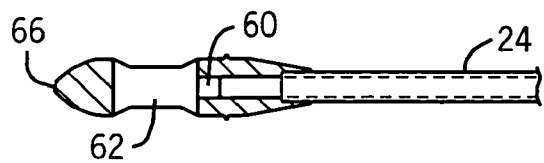
FIG. 6 is a top sectional view taken along line 6—6 of FIG. 5.

The leading end of the feed piece is tapered in a wedge shape. As shown in FIGS. 5 and 6, the feed piece has a flat front edge 66 extending in the thickness dimension of the fish tape (perpendicular to its width) and widening back from there in a both the width and thickness dimensions of the fish tape in a generally straight, but slightly convex contour. The result wedge shape provides improved feedablity through tight spaces such as crowded conduit.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

What is claimed is:

1. A fish tape assembly, comprising:
a fish tape reel; and
a fish tape mounted to the reel so as to be capable of being unwound in a feed direction relative to the reel, the fish tape being made of a composite of at least two electrically non-conductive materials including a fiberglass core and a nylon jacket formed to have a rectilinear cross-section.

2. The fish tape assembly of claim 1, wherein the fish tape has a greater width dimension than thickness dimension.

3. The fish tape assembly of claim 2, wherein the width dimension is at least 1.5 times the thickness dimension.

4. The fish tape assembly of claim 3, wherein the thickness dimension is 2 millimeters or less.

5. The fish tape assembly of claim 1, further comprising a feed piece connected to a leading end of the fish tape, wherein the feed piece is made of an electrically non-conductive material.

6. The fish tape assembly of claim 5, wherein the feed piece has a rectilinear opening sized to receive the fish tape.

7. The fish tape assembly of claim 6, wherein the feed piece is bonded to the fish tape.

8. The fish tape assembly of claim 5, wherein the feed piece includes an eyelet.

9. The fish tape assembly of claim 5, wherein the feed piece has a wedge-shaped leading end opposite the connection of the feed piece to the fish tape.

10. The fish tape assembly of claim 5, further including an anchor piece connecting a trailing end of the fish tape to the reel.

11. A fish tape assembly, comprising:
a fish tape reel;
a fish tape mounted to the reel so as to be capable of being unwound in a feed direction relative to the reel, the fish tape being made of an electrically non-conductive material having a rectilinear cross-section;
a feed piece connected to a leading end of the fish tape, wherein the feed piece is made of an electrically non-conductive material; and
an anchor piece connecting a trailing end of the fish tape to the reel;
wherein the anchor piece connects to the reel such that the trailing end of the fish tape extends in a tangential direction with respect to the reel.

12. The fish tape assembly of claim 11, wherein the anchor piece is dog-leg shaped.

13. A fish tape assembly, comprising:
an electrically non-conductive fish tape having a rectilinear cross-section and a leading end; and
an electrically non-conductive feed piece having a trailing end with a rectilinear opening receiving the leading end of the fish tape where the feed piece is bonded to the fish tape;
wherein the fish tape is a composite two electrically non-conductive materials including a fiberglass core surrounded by a nylon jacket.

14. The fish tape assembly of claim 13, wherein the fish tape has a width dimension that is at least 1.5 times its thickness dimension.

15. The fish tape assembly of claim 13, wherein the feed piece is bonded to the fish tape by an adhesive.

16. The fish tape assembly of claim 13, wherein the feed piece has a wedge-shaped leading end.

17. The fish tape assembly of claim 13, further including an electrically non-conductive anchor piece bonded to a trailing end of the fish tape, wherein the anchor piece is angled so as to connect the trailing end of the fish tape tangentially to a reel mounting the fish tape.

18. A fish tape assembly, comprising:
an electrically non-conductive fish tape having a rectilinear cross-section and a leading end and a trailing end;
an electrically non-conductive feed piece mounted to the leading end of the fish tape; and
an electrically non-conductive anchor pieced mounted to the trailing end of the fish tape;
wherein the anchor piece is angled such that a portion of the anchor piece has a mounting member that extends at an angle relative to the trailing end of the fish tape.

19. The fish tape assembly of claim 18, wherein the fish tape is a composite structure.

20. The fish tape assembly of claim 18, wherein the feed piece has a wedge shaped leading end.

21. The fish tape assembly of claim 18, wherein the feed piece and the anchor piece are bonded to the fish tape.

22. The fish tape assembly of claim 18, wherein the feed piece has an eyelet and is bonded to the leading end of the fish tape so as to sustain a pulling load of 500 pounds without separating from the fish tape.

* * * * *